(12) United States Patent
O'Hara et al.

(10) Patent No.: US 11,734,864 B2
(45) Date of Patent: Aug. 22, 2023

(54) HISTOGRAM BIN INTERVAL APPROXIMATION

(71) Applicant: Business Objects Software Ltd., Dublin (IE)

(72) Inventors: Paul O'Hara, Dublin (IE); Malte Christian Kaufmann, Dublin (IE); Esther Rodrigo Ortiz, Dublin (IE); Conor White, Dublin (IE)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 90 days.

(21) Appl. No.: 17/514,801

(22) Filed: Oct. 29, 2021

(65) Prior Publication Data

US 2023/0133856 A1 May 4, 2023

(51) Int. Cl.
*G06T 11/20* (2006.01)
*G06F 18/2431* (2023.01)

(52) U.S. Cl.
CPC ........ *G06T 11/206* (2013.01); *G06F 18/2431* (2023.01)

(58) Field of Classification Search
CPC ............................ G06T 11/206; G06F 18/2431
See application file for complete search history.

(56) References Cited

U.S. PATENT DOCUMENTS

| 2003/0033403 A1* | 2/2003 | Rhodes | H04L 43/02 709/224 |
| 2008/0027687 A1* | 1/2008 | Aldridge | G06Q 10/06 703/2 |

* cited by examiner

*Primary Examiner* — Michelle L Sams
(74) *Attorney, Agent, or Firm* — Fountainhead Law Group P.C.

(57) ABSTRACT

Using approximated bin intervals to label the histograms provides clarity and allows for the histogram to be more intuitively understood. A dataset may comprise a plurality of records having a plurality of features including one or more continuous features. A selection of a continuous feature may be obtained. A bin width based on a number of bins and feature statistics of the continuous feature may be determined. An approximated bin interval range is determined by applying a bin mask based on the bin width to the feature statistics. An approximated bin width is determined based on the number of bins and the approximated bin interval range. Approximated bin intervals for the histogram are determined based on the approximated bin width. A histogram is generated having bins with intervals based the approximated bin intervals.

20 Claims, 8 Drawing Sheets

HISTOGRAM BIN INTERVAL APPROXIMATION

BACKGROUND

The present disclosure pertains to histograms, and in particular to approximation of histogram bin intervals.

The volume and complexity of available data collected and stored by organizations is constantly increasing. The size of this data may vary from petabytes to zettabytes or beyond. Some examples where large datasets can exist include sensor data and transaction data. Sensor data may be the output from a device that detects and responds to some type of input from an environment. With the rise of the Internet of Things (IoT) and smart devices, sensor data has grown exponentially with massive volumes of data produced and transmitted from sensing devices. Sensors are utilized to collect data across many distinct fields today, and include healthcare, and manufacturing. Transaction data may include records and metadata of various types of transactions. Analysts may be responsible for monitoring huge quantities of transaction data to establish predictions, uncover patterns and devise strategies.

With such massive datasets, data visualizations are an essential component which facilitates organizations in the analysis of massive amounts of information and data-driven decision making. Data visualization refers to the graphical representation of statistical and other types of numeric and non-numeric data. Visual elements such as charts, graphs, and maps are examples of data visualizations that provide an accessible way to identify and understand trends, relationships, outliers, and patterns in data. Data visualizations are often used in combination with a narrative to improve understanding, as through data visualizations useful information can be highlighted to facilitate the audience in intuitively understanding the identification of trends, patterns, outliers, etc.

Some of the benefits of a data visualizations include intuitive understanding (e.g., trends and patterns are easily identifiable) and quicker insights (e.g., data visualizations make the complexities of a dataset clear), facilitation of story telling (e.g., the selection of the correct visualization may illustrate a trend or relationship between groups of values), and decision making (e.g., data visualization may transforms data into a consumable format that facilitates informed opinions and decisions to be achieved).

Achieving an effective data visualization through where data becomes more understandable is challenging, with the data and the components of a visualization needing to work together to produce a coherent narrative. Some important aspects to consider when presenting data through a data visualization include the requirements of the visualization (e.g., ensure that unnecessary information is excluded from the visualization), the audience of the visualization (e.g., the requirements of the audience it is intended for), the correct data for visualization (e.g., selecting the correct method of visualization or diagram for presenting the data), and appropriate labeling (e.g., labeling of the visualization that is clear and comprehensible).

One such method of data visualization where the above aspects apply is the histogram. A histogram is a data visualization enabling the discovery of the underlying frequency distribution (e.g., "shape") of continuous data. A histogram enables inspection of the data for its underlying distribution, outliers, skew, etc. To construct a histogram, the range of values of the data to be visualized are be placed into "bins." That is, the entire range of values is divided into a series of intervals where, depending on the visualization requirement, a calculation is performed on the values that are assigned to each bin (corresponding to an interval). For example, if a visualization requirement is to inspect the underlying distribution of a continuous feature, then a count may be performed of how many values fall into each bin (interval). The bins may be specified as consecutive, non-overlapping intervals of equal width.

When utilizing a histogram for data visualization it is important to appropriately label bins to ensuring the interval information for each bin is clear and immediately understood, for the reasons described above. However, challenges may arise when the continuous data to be visualized contains large values or has uneven ranges. For instance, a histogram with a bin width of 1,000 may result in labeled bin intervals that are clear and intuitively understood while a histogram with a bin width of 954.32 may result in labeled bin intervals that fail to be immediately clear to the user. Unclear bin labels may cause data visualization noise and diminish the clarity of the information conveyed and quality of the data visualization.

Accordingly, there is a need for improved techniques for labeling bin intervals. The present disclosure addresses these issues and others, as further described below.

SUMMARY

One embodiment provides a computer system comprising one or more processors and one or more machine-readable medium coupled to the one or more processors. The one or more machine-readable medium storing computer program code comprises sets of instructions. The sets of instructions executable by the one or more processors to obtain, via a user interface, a selection of a continuous features of a dataset for representation in a histogram. The dataset comprises a plurality of records having a plurality of features including one or more continuous features. Each of the plurality of records has corresponding values for each of the plurality of features, where values for the one or more continuous features are quantitative numerical values. The instructions are further executable to determine a number of bins for the histogram. The instructions are further executable to determine a bin width based on the number of bins and feature statistics of the continuous feature. The instructions are further executable to determine an approximated bin interval range by applying a bin mask based on the bin width to the feature statistics. The instructions are further executable to determine an approximated bin width based on the number of bins and the approximated bin interval range. The instructions are further executable to determine approximated bin intervals for the histogram based on the approximated bin width. The instructions are further executable to generate a histogram for the continuous feature. The histogram has the number of bins and the bins of the histogram have intervals based the approximated bin intervals. Each bin of the histogram represents a count of values of the continuous feature in the dataset within the corresponding approximated bin interval. The instructions are further executable to present the histogram for the continuous feature in the user interface.

Another embodiment provides one or more non-transitory computer-readable medium storing computer program code. The computer program code comprises sets of instructions to obtain, via a user interface, a selection of a continuous features of a dataset for representation in a histogram. The dataset comprises a plurality of records having a plurality of features including one or more continuous features where each of the plurality of records has corresponding values for each of the plurality of features. The values for the one or more continuous features are quantitative numerical values. The computer program code further comprises sets of instructions to determine a number of bins for the histogram. The computer program code further comprises sets of instructions to determine a bin width based on the number of bins and feature statistics of the continuous feature. The computer program code further comprises sets of instructions to determine an approximated bin interval range by applying a bin mask based on the bin width to the feature statistics. The computer program code further comprises sets of instructions to determine an approximated bin width based on the number of bins and the approximated bin interval range. The computer program code further comprises sets of instructions to determine approximated bin intervals for the histogram based on the approximated bin width. The computer program code further comprises sets of instructions to generate a histogram for the continuous feature. The histogram has the number of bins and the bins of the histogram have intervals based the approximated bin intervals. Each bin of the histogram represents a count of values of the continuous feature in the dataset within the corresponding approximated bin interval. The computer program code further comprises sets of instructions to present the histogram for the continuous feature in the user interface.

Another embodiment provides a computer-implemented method. The method includes obtaining, via a user interface, a selection of a continuous features of a dataset for representation in a histogram. The dataset comprises a plurality of records having a plurality of features including one or more continuous features where each of the plurality of records has corresponding values for each of the plurality of features. Values for the one or more continuous features are quantitative numerical values. The method further comprises determining a number of bins for the histogram. The method further comprises determining a bin width based on the number of bins and feature statistics of the continuous feature. The method further comprises determining an approximated bin interval range by applying a bin mask based on the bin width to the feature statistics. The method further comprises determining an approximated bin width based on the number of bins and the approximated bin interval range. The method further comprises determining approximated bin intervals for the histogram based on the approximated bin width. The method further comprises generating a histogram for the continuous feature. The histogram has the number of bins and the bins of the histogram have intervals based the approximated bin intervals. Each bin of the histogram represents a count of values of the continuous feature in the dataset within the corresponding approximated bin interval. The method further comprises presenting the histogram for the continuous feature in the user interface.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein. While certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. Furthermore, the terms "first," "second," "third," "fourth," etc., used herein do not necessarily indicate an ordering or sequence unless indicated. These terms may merely be used for differentiation between different objects or elements without specifying an order.

As mentioned above, it is important to appropriately label bins of a histogram to ensure that the interval information for each bin of the histogram is clear and immediately understood, for the reasons described above. However, challenges may arise when the continuous data to be visualized contains large values or has uneven ranges. For instance, a histogram with a bin width of 1,000 may result in labeled bin intervals that are clear and intuitively understood while a histogram with a bin width of 954.32 may result in labeled bin intervals that fail to be immediately clear to the user. Unclear bin labels may cause data visualization noise and diminish the clarity of the information conveyed and quality of the data visualization.

Figure 1:
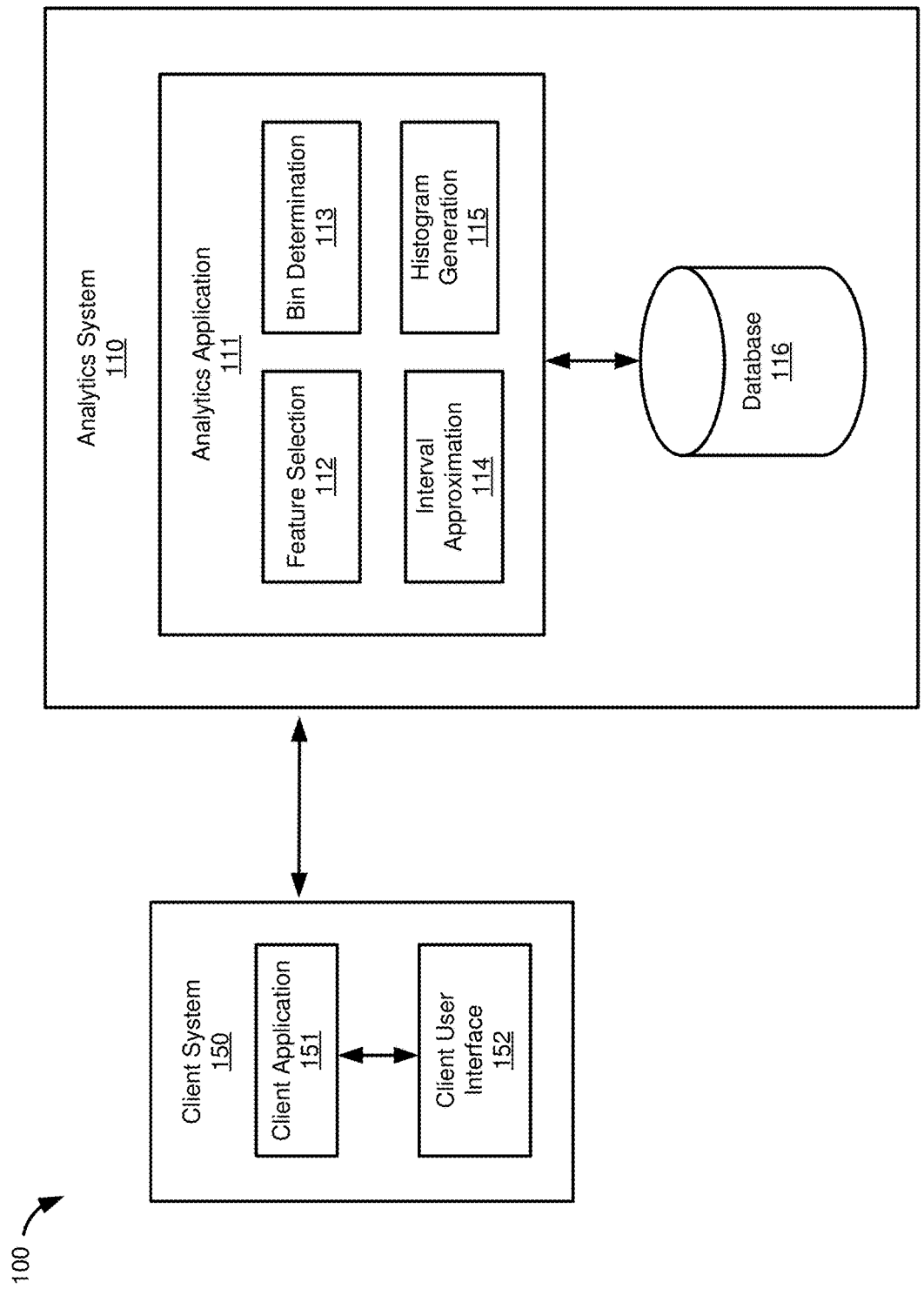
FIG. 1 shows a diagram of an analytics system in communication with a client system, according to an embodiment.

Accordingly, there is a need for improved techniques for labeling bin intervals. The present disclosure addresses these issues and others, as further described below FIG. 1 shows a diagram 100 of an analytics system 110 in communication with a client system 150, according to an embodiment. The analytics system 110 may comprise one or more server computers including one or more database servers. The analytics system may provide an analytics application 111 for analyzing datasets. The analytics application 111 may be provided using a cloud-based platform or an on-premise platform, for example. The datasets may be stored in a database 116. The analytics application 111 may generate visualizations based on data stored in the database 116.

In some embodiments, the analytics application may generate histograms in providing smart discovery and key influencer functionality. The smart discovery process involves executing a machine learning algorithm to uncover new or unknown relationships between columns within a dataset. Smart discovery provides an overview of a dataset by automatically building charts to enable information discovery from the data. As part of the smart discovery output, key influencers may be displayed. The key influencers may be the top 10, for example, ranked features of the dataset that most significantly impact the selected target of the smart discovery. For each listed key influencer, the analytics application 111 may provide specific visualizations to illustrate the relationship between the influencer and the target. One of the specific visualizations is a histogram, which may be generated using bin interval approximation as described herein.

The client system 150 includes a client application 151. The client application 151 may be a software application or a web browser, for example. The client application 151 may be capable of rendering or presenting visualizations on a client user interface 152. The client user interface may include a display device for displaying visualizations and one or more input methods for obtaining input from a user of the client system 150.

The client system 150 may communicate with the analytics system 110 (e.g., over a local network or the Internet). For example, the client application 151 may query or request visualizations based on data stored in the database 116. In some cases, the client system 150 may request generation of a histogram. The analytics system 110 may generate a histogram having approximated bin intervals such that the histogram is clear and may be intuitively understood by the user of the client system 150.

In order to generate a histogram having approximated bin intervals, the analytics application 111 may perform feature selection 112 to identify a continuous feature of the data set. The analytics application 111 may also perform bin determination 113 to determine a number of bins for the histogram. The analytics application 111 may also perform interval approximation 114 to determine approximated bin intervals for the bins of the histogram. The analytics application 115 may also perform histogram generation 115 to generate a histogram having the approximated bin intervals. The histogram may be provided to the client application 151 of the client system 150 for presentation on the client user interface 152. Feature selection 112, bin determination 113, interval approximation 114, and histogram generation 115 are described in further detail below.

Figure 2:
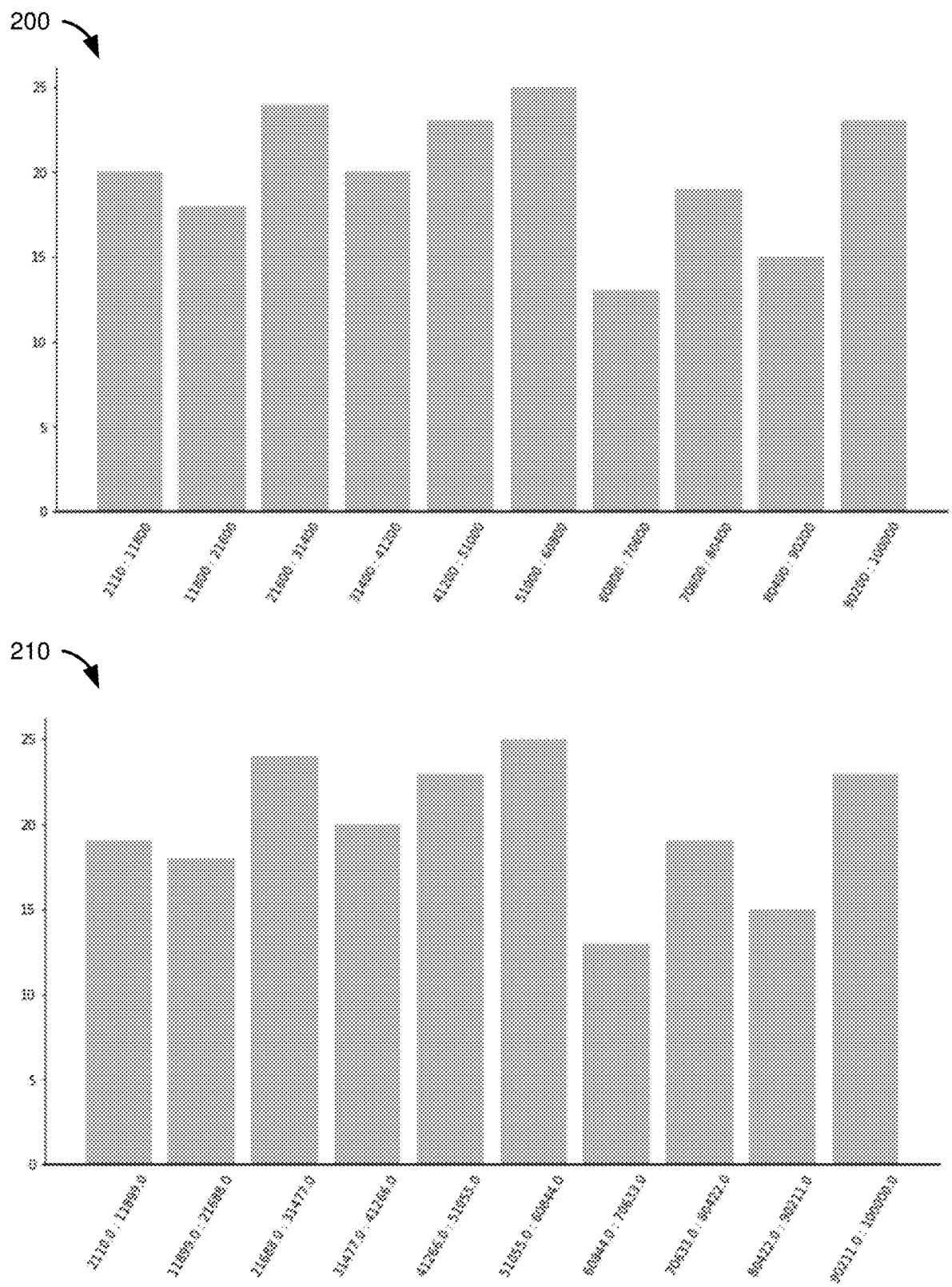
FIG. 2 shows a histogram with approximated bin intervals compared to a histogram without approximated bin intervals, according to an embodiment.

FIG. 2 shows a histogram 200 with approximated bin intervals compared to a histogram 210 without approximated bin intervals, according to an embodiment. The histogram 200 having approximated bin intervals may be generated using the bin interval approximation techniques described below. As shown in FIG. 2, the approximated bin intervals of the histogram 200 are more clear, more intuitive, and more easily recognized compared to the non-approximated intervals of the histogram 210. That is because numbers in a base-ten (decimal) system may be more clear and easier to recognize when approximated based on powers of ten.

Techniques for determining approximated bin intervals are described below with respect to FIG. 3-7.

Figure 3:
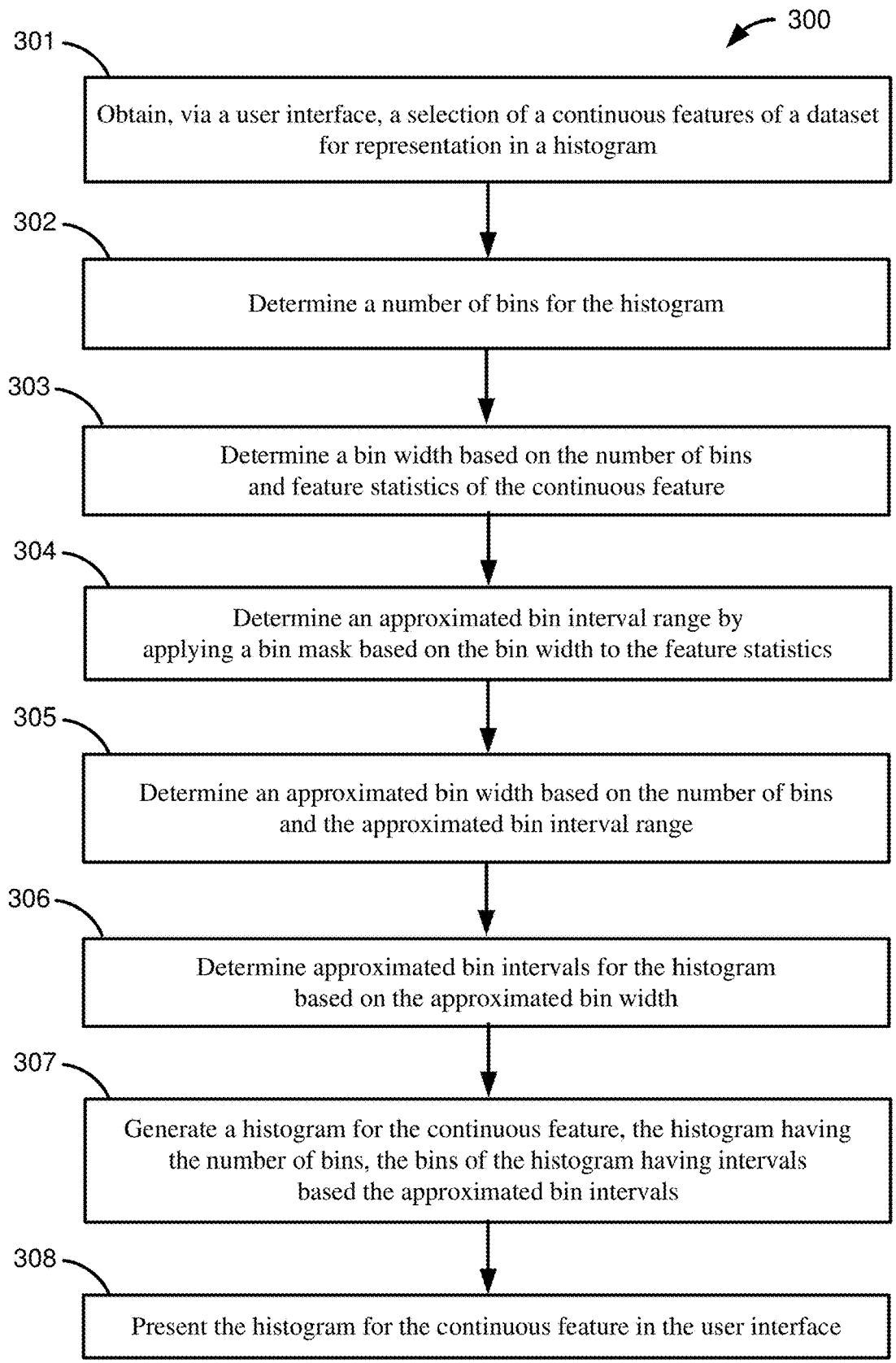
FIG. 3 shows a flowchart of a method for generating histograms, according to an embodiment.

FIG. 3 shows a flowchart 300 of a method for generating histograms, according to an embodiment. The method may be performed by an analytics system such as the analytics system 110 described above with respect to FIG. 1.

At 301, the method may obtain, via a user interface, a selection of a continuous features of a dataset for representation in a histogram. The selection may be based on an input or selection of a user. The dataset may comprise a plurality of records having a plurality of features including one or more continuous features. Each of the plurality of records may have corresponding values for each of the plurality of features. The values for the one or more continuous features may be quantitative numerical values.

At 302, the method may determine a number of bins for the histogram. In some embodiments the number of bins may be predetermined based on a format or configuration of a user interface for presenting the histogram. For example, the number of bins may be set to 10 for a given user interface.

At 303, the method may determine a bin width based on the number of bins and feature statistics of the continuous feature. The feature statistics of the continuous feature include a maximum value of the continuous feature in the dataset and a minimum value of the continuous feature in the dataset, for example.

At 304, the method may determine an approximated bin interval range by applying a bin mask based on the bin width to the feature statistics. In some embodiments, the approximated bin interval range may be based on a treated maximum value and a treated minimum value. The treated maximum value may be determined by rounding the maximum value of the continuous feature and then multiplying that by the bin mask. The treated minimum value may be determined by rounding the maximum value of the continuous feature and then multiplying that by the bin mask. In some embodiments, the determination of the approximated bin interval range is based on an absolute value of a difference between the rounded maximum value and the rounded minimum value.

At 305, the method may determine an approximated bin width based on the number of bins and the approximated bin interval range. In some embodiments, the approximated bin width has a treatment applied if the approximate bin width is not divisible by 10. In some embodiments, an approximation treatment is applied to the approximated bin width if the approximate bin width is not divisible by 10.

At 306, the method may determine approximated bin intervals for the histogram based on the approximated bin width.

At 307, the method may generate a histogram for the continuous feature. The histogram may have the number of bins. The bins of the histogram may have intervals based the approximated bin intervals. Each bin of the histogram may represent a count of values of the continuous feature in the dataset within the corresponding approximated bin interval.

At 308, the method may present the histogram for the continuous feature in the user interface.

Figure 4:
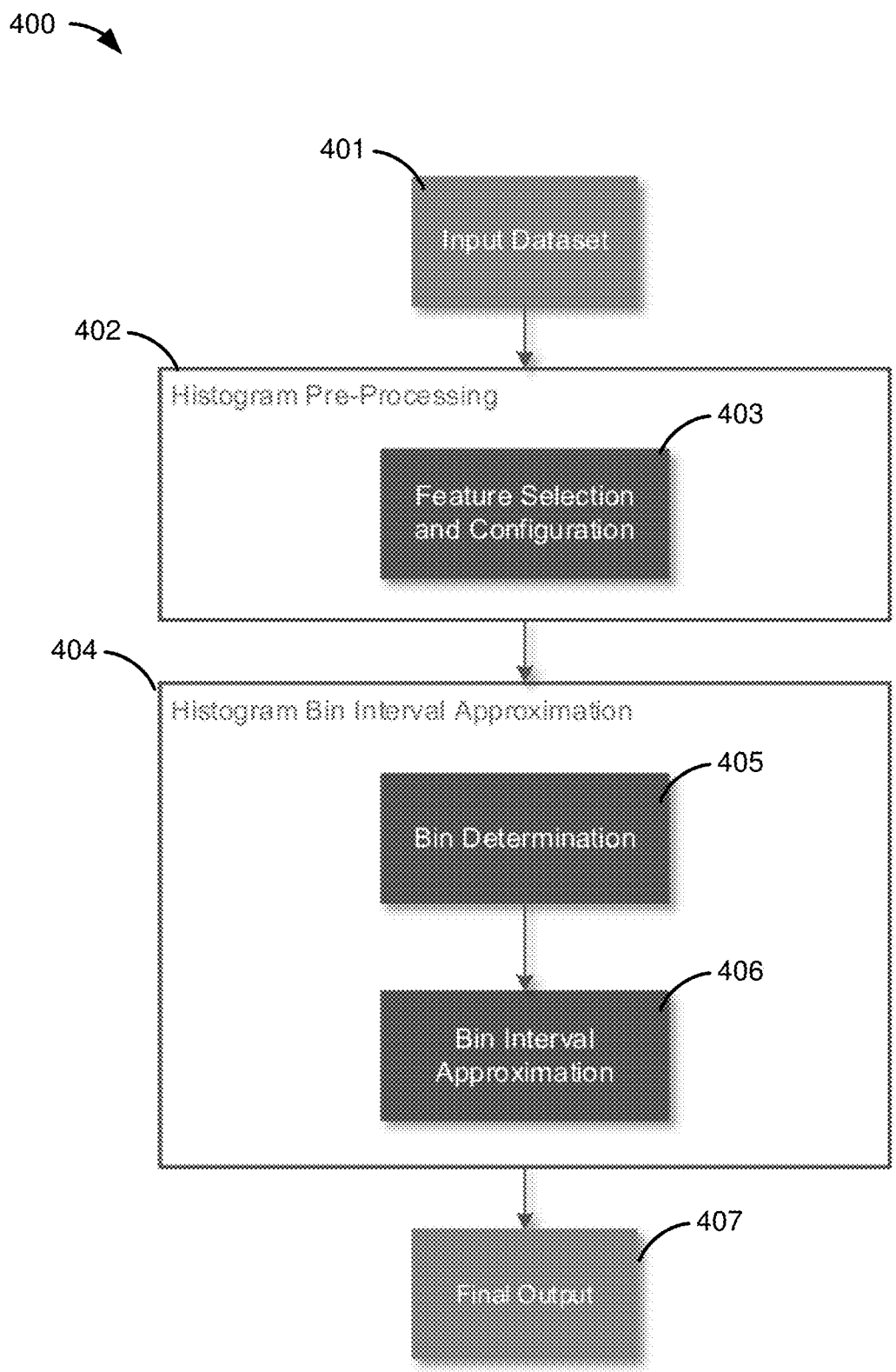
FIG. 4 shows a diagram of a process for generating histograms having approximated bin intervals, according to an embodiment.

FIG. 4 shows a diagram 400 of a process for generating histograms having approximated bin intervals, according to an embodiment. The histogram bin interval approximation process may be applied to any histogram data visualization where a continuous value is represented on the x-axis. Generating histograms having approximated bin intervals enable the intuitive communication of the each bin range, while maintaining an equivalent bin width to the true bin intervals and ensuring the content of each bin is approximately equivalent to bin intervals produced where no approximation was applied. As such, the information to be conveyed by the histogram is consistently clear and intuitive to the visualization's audience.

The process for generating histograms having approximated bin intervals may be applicable to input datasets 401 comprising one or more continuous features. The process comprises histogram Pre-Processing 402 and Histogram Bin Interval Approximation 404. Histogram Pre-Processing 402 comprises Feature Selection and Configuration 403. Feature Selection and Configuration 403 may constrain the dataset, identify the continuous feature the bins and interval ranges of the x-axis are to be derived in relation to. Furthermore, Feature Selection and Configuration 403 may define configuration details controlling the range of values on the x-axis. The selected continuous feature and defined configuration details are then passed to Histogram Bin Interval Approximation 404.

Histogram Bin Interval Approximation 402 includes Bin Determination 405 and Bin Interval Approximation 406. Bin Determination 405 may be applied to the selected continuous feature and statistics derived. Then, utilizing the derived statistics, a value representing the number of bins to be materialized for the histogram may be derived. The derived statistics and derived number of bins value may then be passed to Bin Interval Approximation 406.

Bin Interval Approximation 406 takes as input the derived continuous feature statistics and number of bins value. From the continuous feature statistics, a bin mask is derived and utilized to apply a treatment to the statistics of the continuous feature, producing treated maximum and minimum value statistics. Using the number of bins value and treated statistics an approximated bin interval range may be determined and subsequently an approximated bin width may be derived. The approximated bin intervals may be determined using the approximated bin width, treated maximum and minimum statistics, and defined histogram configuration details.

The output 407 is approximated bin intervals for the histogram that clearly communicate the value range for each bin, while maintaining a bin width equivalent to the true bin intervals ensuring the content of each bin is approximately equivalent to as if no bin interval approximation was applied. Histogram Pre-Processing 403 and Histogram Bin Interval Approximation 404 are described in further detail below.

Figure 5:
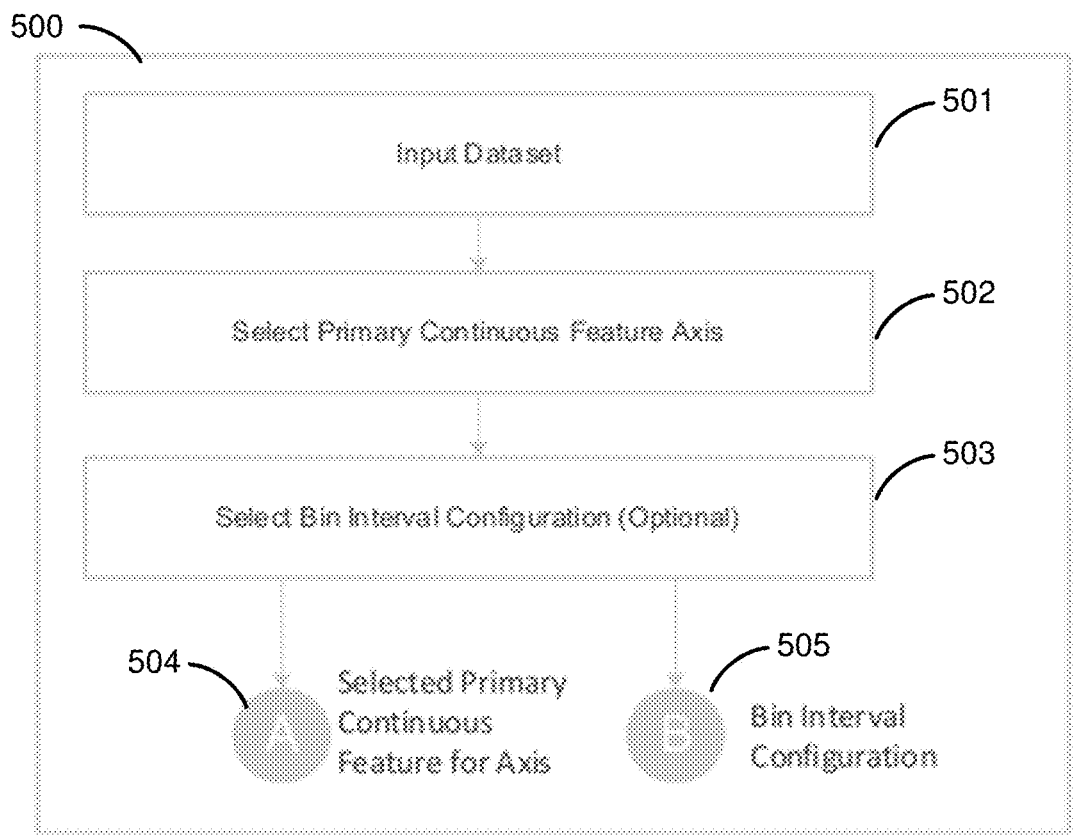
FIG. 5 shows a diagram of data preprocessing for a histogram, according to an embodiment.

FIG. 5 shows a diagram of data preprocessing 500 for a histogram, according to an embodiment. The data preprocessing in diagram 500 shows further details of the Histogram Pre-Processing 403 described above with respect to FIG. 4.

An input dataset 501 may be provided as input. The input dataset 501 may represent a structured form of data presented in tabular form, for example. Within the tabular format, columns may represent labeled features and row may hold the values of these features relative to their respective columns. The labeled features may represent continuous or categorical data. Continuous Features may refer to numeric data having a potentially infinite number of possible values within a selected range. An example of a continuous feature would be temperature. Continuous features may also refer to data that could potentially have an infinite number of possible values but that is limited based on a software or data format or protocol. Categorical Feature may refer to data containing a finite number of possible categories. The data may or may not have a logical order. Examples of categorical data include days of the week, names of countries, etc.

A Select Primary Continuous Feature Axis 502 process may select a continuous feature from the input dataset 501. The continuous feature may represent the feature from which the approximated bin intervals for the histogram bins will be derived. Then, Bin Interval Configuration 503 settings are optionally selected for application to the approximated Bin Intervals after they are determined, as further described below. The bin interval configurations may include sort order configurations that may arranges the Approximated Bin Interval in either ascending or descending order based on the values of the Approximated Bin Intervals. The bin interval configurations may also include Bin Interval Truncation in which the first and last materialized Approximated Bin Intervals are identified and their respective maximum and minimum interval value restricted to the minimum and maximum value of the selected continuous value.

If no configuration options are selected, default selections may be applied. For example, sort order may be selected to be ascending and bin interval truncation may be selected to be applied. Other bin interval configuration settings may also be applied.

The outputs of the preprocessing include the selected primary continuous feature for axis 504 (labeled "A" in FIG. 5) and the bin interval configuration settings 505 (labeled "B" in FIG. 5). The selected primary continuous feature for axis 504 may be used in a bin determination process as further described below with respect to FIG. 6. The bin interval configuration settings 505 may be used in a bin interval approximation process as further described below with respect to FIG. 7.

As mentioned above, Histogram Bin Interval Approximation part comprises two components, Bin Determination and Bin Interval Approximation. Bin Determination utilizes the selected continuous feature and derives statistics surrounding the continuous feature. Then utilizing the derived statistics, a value representing the number of bins to be materialized for the histogram is derived. The derived statistics and derived number of bins value are passed to the Bin Interval Approximation component.

The Bin Interval Approximation component takes as input the derived continuous feature statistics and number of bins value. From the continuous feature statistics, a bin mask may be derived and applied to the statistics of the continuous feature producing an approximated bin interval range. Utilizing the number of required bins and approximated bin interval range an approximated bin width may be derived. Subsequently, the approximated bin intervals are materialized utilizing the approximated bin width and defined histogram configuration details.

The output is approximated bin intervals for the histogram that clearly communicate the value range for each bin, while maintaining a bin width equivalent to the true bin intervals, ensuring the content of each bin is approximately equivalent to as if no bin interval approximation was applied. Bin Determination and Bin Interval Approximation are described in further detail below.

Figure 6:
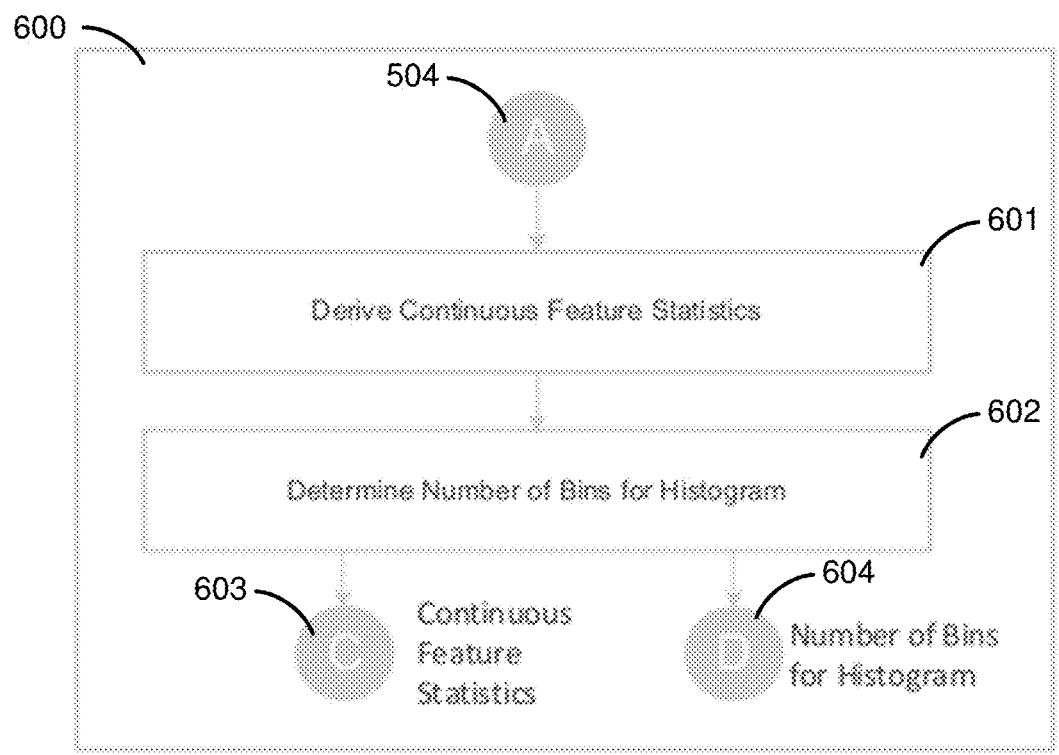
FIG. 6 shows a diagram of bin determination for a histogram, according to an embodiment.

FIG. 6 shows a diagram of bin determination 600 for a histogram, according to an embodiment. The selected primary continuous feature for axis 504 (labeled "A" in FIGS. 5 and 6) is input to the Bin Determination component. A Derive Continuous Feature Statistics 601 component may calculate descriptive statistics for the selected continuous feature using the values of the continuous feature in the dataset. Examples of descriptive statistics include minimum, maximum, mean, count and variance. The descriptive statistics of minimum and maximum are further described below but in other embodiments other statistics may be used.

The descriptive statistics are calculated and then provided to a Determine Number of Bins for Histogram component 602. A procedure is applied to determine the number of bins for the histogram. This procedure can be an algorithm utilizing the calculated statistics or a predefined constant. In some embodiments, a predefined constant of 10 is used for bin determination (i.e., the number of bins is 10), though in other embodiments other bin determination algorithms can equally be applied. Examples of bin determination algorithms include Sturge's Rule and Freedman-Diaconis Rule.

The output of the Determine Number of Bins for Histogram component 602 are continuous feature statistics 603 (labeled "C" in FIG. 6) and the Number of Bins for the Histogram 604 (labeled "D" in FIG. 6). These outputs may be passed to the Bin Interval Approximation component described below with respect to FIG. 7.

Figure 7:
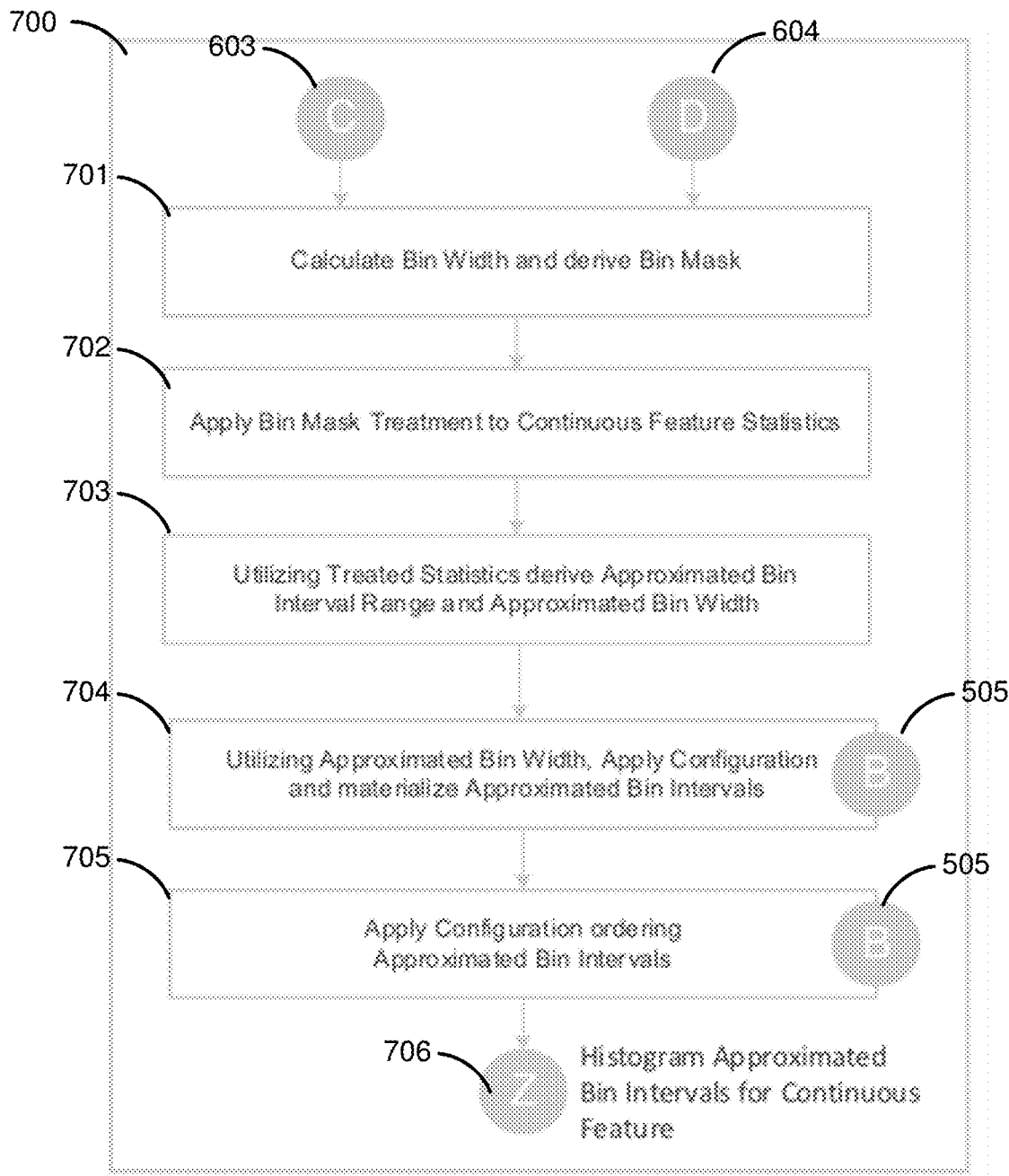
FIG. 7 shows a diagram of bin interval approximation for a histogram, according to an embodiment.

FIG. 7 shows a diagram of bin interval approximation 700 for a histogram, according to an embodiment. The Continuous Feature Statistics 603 ("C") and the derived Number of Bins value 604 ("D") may be input to the Bin Interval Approximation component 700.

The bin interval approximation component 700 includes a Calculate Bin Width and derive Bin Mask process 701, an Apply Bin Mask Treatment to Continuous Feature Statistics process 702, a Utilizing Treated Statistics to derive Approximated Bin Interval Range and Approximated Bin Width process 703. A Utilizing Approximated Bin Width and Apply Configuration and materialize Approximated Bin Interval process 704, and an Apply Configuration ordering Approximated Bin Intervals process 705. The output of these processes is a Histogram with Approximated Bin Intervals for a Continuous Feature 706 (labeled "Z" in FIG. 7). These processes are further described below.

The Calculate Bin Width and derive Bin Mask process 701 is now described. A Calculate Bin Width and device Bin Mask component 701 may use the Continuous Feature Statistics 603 and Number of Bins value 604 to calculate a bin width. An exemplary algorithm to calculate the bin width is:

$$bin_{width} = \frac{abs(continousfeature_{max} - continousfeature_{min})}{number\ of\ bins}$$

Once bin width is calculated, a bin mask may be derived based on the continuous feature maximum and minimum statistics. An exemplary algorithm for calculating the bin mask is:

$$bin_{mask} = \begin{cases} 10^{len(bin_{width})-1} & \text{if } bin_{width} > 1 \\ bin_{width} \end{cases}$$

Where $len(bin_{width})$ is the number of integers present in the $bin_{width}$.

For example, let $bin_{width}=2400$, then:
$len(bin_{width})=4$, with:
$bin_{mask}=10^{4-1}$
$bin_{mask}=10^3$
$bin_{mask}=1000$
An example derivation of $bin_{mask}$ is as follows:

| continuousfeature$_{max}$ | continuousfeature$_{min}$ | number bins | bin$_{width}$ | bin$_{mask}$ |
|---|---|---|---|---|
| 100,000 | 2,110 | 10 | 9.789 | 1000 |

The Apply Bin Mask Treatment to Continuous Feature Statistics process 702 is now described. Utilizing the $bin_{mask}$, a treatment may then be applied to the continuousfeature$_{max}$ and continuousfeature$_{min}$ statistics, setting continuousfeature$_{max}$ and continuousfeature$_{min}$ values to the nearest whole number where continuousfeature$_{max}$ is rounded up, and continuousfeature$_{min}$ round down. Exemplary algorithms to calculate the treated$_{min}$ and treated$_{max}$ are:

$$treated_{min} = \left\lfloor \frac{continousfeature_{min}}{bin_{mask}} \right\rfloor * bin_{mask}$$

$$treated_{max} = \left\lceil \frac{continousfeature_{max}}{bin_{mask}} \right\rceil * bin_{mask}$$

In the equations above, the brackets with flags at the bottom and not the top indicates the floor operation being applied (e.g., round down), and the brackets with flags at the top and not the bottom indicate the ceiling operating being applied (e.g., round up).

An example derivation of treated$_{max}$ and treated$_{min}$ is as follows:

| continuousfeature$_{max}$ | continuousfeature$_{min}$ | bin$_{mask}$ | treated$_{max}$ | treated$_{min}$ |
|---|---|---|---|---|
| 100,000 | 2,110 | 1000 | 100,000 | 2,000 |

The Utilizing Treated Statistics to derive Approximated Bin Interval Range and Approximated Bin Width process 703 is now described. The treated$_{max}$ and treated$_{min}$ values are utilized and an approximated$_{bin\ interval\ range}$ and approximated$_{bin\ width}$ may be derived. The approximated$_{bin\ width}$ may ensure that consistent and intuitive bin intervals are produced for consumption within a histogram without loss of information conveyed from the underlying histogram. An exemplary algorithm to derive the approximated$_{bin\ width}$ is:

$$approximated_{bin\ width} = \frac{approximated_{bin\ interval\ range}}{number\ of\ bins}$$

Where:

approximated$_{bin\ interval\ range}$=abs(treated$_{max}$−treated$_{min}$)

An example derivation of approximated$_{bin\ width}$ is as follows:

| treated$_{max}$ | treated$_{min}$ | approximated$_{binintervalrange}$ | Number of bins | approximated$_{binwidth}$ |
|---|---|---|---|---|
| 100,000 | 2,000 | 98,000 | 10 | 9,800 |

If the approximated$_{binwidth}$ is not divisible by 10, for example, an approximation treatment may be applied to ensure intuitive bin intervals are provided. An exemplary approximation treatment algorithm to derive the final approximated$_{binwidth}$ is:

$$approximated_{binwidth} = \begin{cases} approximation_{treatment}(approximated_{binwidth}, bin_{mask}, base), & \frac{approximated_{binwidth}}{10} \neq 0 \\ approximated_{binwidth}, & \frac{approximated_{binwidth}}{10} = 0 \end{cases}$$

Where:

$$approximation_{treatment}(approximated_{binwidth,} bin_{mask}, base) =$$

$$\begin{cases} \left\lfloor \frac{approximated_{binwidth}}{\left(\frac{bin_{mask}}{base}\right)}, 0 \right\rceil \cdot \left(\frac{bin_{mask}}{base}\right), & bin_{mask} \neq 1 \\ \left\lfloor \frac{approximated_{binwidth}}{\left(\frac{bin_{mask}}{base}\right)}, 1 \right\rceil \cdot \left(\frac{bin_{mask}}{base}\right), 1 \right\rceil, & bin_{mask} = 1 \end{cases}$$

With the brackets having one top flag and one bottom flag representing the rounding operation (e.g., numbers ending with 5 or greater are rounded up and those ending with 4 or less are rounded down), with n representing the number of decimal places to round to.

The Utilizing Approximated Bin Width and Apply Configuration and materialize Approximated Bin Interval process 704 is now described. Utilizing the approximated$_{bin\ width}$, the bin intervals for the histogram are produced based on the defined Number of Bins value, approximated$_{bin\ width}$ and treated$_{min}$, treated$_{max}$ statistics. Furthermore, if the optional bin truncation configuration has been selected, the maximum bin and minimum bin are updated, setting the maximum and minimum bin value to the pre-treated continousfeaturemin,continuousfeature$_{max}$ values. An example application of bin truncation configuration is as follows:

| Approximated Bin interval | Truncated Approximated Bin interval |
|---|---|
| 2000:11800 | 2110:11800 |
| 11800:21600 | 11300:21600 |
| 21600:31400 | 21600:31400 |
| 31400:41200 | 31400:41200 |
| 41200:51000 | 41200:51000 |
| 51000:60800 | 51000:60800 |
| 60800:70600 | 60800:70600 |
| 70600:80400 | 70600:80400 |
| 80400:90200 | 80400:90200 |
| 90200:100000 | 90200:100000 |

The Apply Configuration ordering Approximated Bin Intervals process 705 is now described. Once all bin intervals are produced the bin intervals may be ordered in ascending or descending order based on the defined configuration.

As output 706, a list of ordered intuitive bin intervals is produced where each bin represents a container to hold the aggregated information for display within a histogram. Accordingly, this process fulfils the Intuitive Bin Interval discovery problem described above in that the Histogram Bin Interval Approximation process outputs ordered intuitive bin intervals for consumption within a histogram without loss of information conveyed from the underlying histogram if no bin interval approximation was performed.

EXAMPLES

In a first example, a continuous feature of a dataset has a Maximum Value of 1087.88 (continuousfeature$_{max}$), the continuous feature has a Minimum Value of 531 (continuousfeature$_{min}$), a Number of Bins of 9(number bins) and the corresponding histogram configurations include Bin Truncation set to True and Sort Order set to Ascending.

First, the bin width (bin$_{width}$) and bin mask are calculated. As discussed above, the bin width may be calculated based on the maximum value, the minimum value, and the number of bins as discussed above. In this example, the bin width may be calculated as 61.77777778.

The bin mask (bin$_{mask}$) may be calculated based on the bin width, as discussed above. In this example, the bin mask may be calculated as 10.

Next, mask treatment is applied to continuous feature statistics as described above. In this example, the treated continuous feature maximum value (treated$_{max}$) is 1090 and the treated continuous feature maximum value (treated$_{min}$) is 530.

Next the approximated bin interval range (approximated$_{bin\ interval\ range}$) and approximated bin width (approximated$_{bin\ width}$) are determined. In this example, the approximated bin interval range is 560 and the approximated bin width is 62.22222222.

Next, determine whether to apply approximation treatment and apply the treatment if so. In this example, the approximated bin width of 62.22222222 is not divisible by 10 and so the treatment will be applied. In this example, a base of 5 is used and the bin mask is 10. Accordingly, the treated approximated bin width is 62.

In this example, Bin Truncation are sorting are applied. The following table shows the actual bin intervals and the approximated bin intervals after approximation.

| Exact Bin Interval | Approximated Bin Interval |
|---|---|
| 531.88:593.66 | 531.88:592.0 |
| 593.66:655.44 | 592.0:654.0 |
| 655.44:717.22 | 654.0:716.0 |
| 717.22:779.0 | 716.0:778.0 |
| 779.0:840.78 | 778.0:840.0 |
| 840.78:902.56 | 840.0:902,0 |
| 902.56:964.34 | 902.0:964.0 |
| 964.34:1026.12 | 964.0:1026.0 |
| 1026.12:1087.9 | 1026.0:1087.88 |

Figure 8:
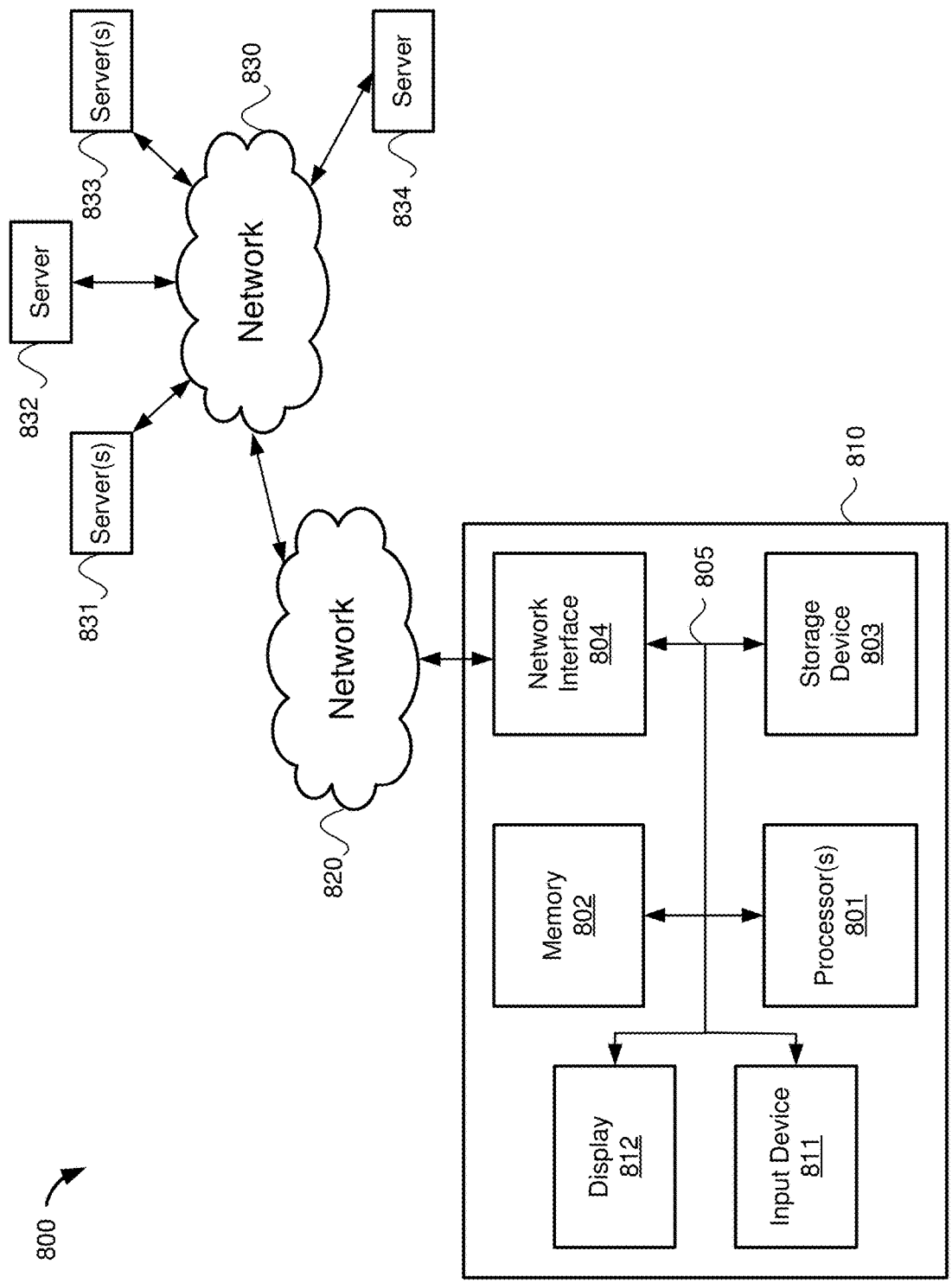
FIG. 8 shows a diagram of hardware of a special purpose computing system for implementing systems and methods described herein.

FIG. 8 shows a diagram 800 of hardware of a special purpose computing system 810 for implementing systems and methods described herein. The computer system 810 includes a bus 805 or other communication mechanism for communicating information, and one or more processors 801 coupled with bus 805 for processing information. The computer system 810 also includes a memory 802 coupled to bus 805 for storing information and instructions to be executed by processor 801, including information and instructions for performing some of the techniques described above, for example. This memory may also be used for storing programs executed by processor(s) 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 803 may include source code, binary code, or software files for performing the techniques above, such as the processes described above, for example. Storage device and memory are both examples of non-transitory computer readable storage mediums.

The computer system 810 may be coupled via bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized buses, for example.

The computer system also includes a network interface 804 coupled with bus 805. The network interface 804 may provide two-way data communication between computer system 810 and a network 820. The network interface 804 may be a wireless or wired connection, for example. The computer system 810 can send and receive information through the network interface 804 across a local area network, an Intranet, a cellular network, or the Internet, for example. In the Internet example, a browser, for example, may access data and features on backend systems that may reside on multiple different hardware servers 831-834 across the network. The servers 831-834 may be part of a cloud computing environment, for example.

ADDITIONAL EMBODIMENTS

Additional embodiments of the present disclosure are further described below.

One embodiment provides a computer system comprising one or more processors and one or more machine-readable medium coupled to the one or more processors. The one or more machine-readable medium storing computer program code comprises sets of instructions. The sets of instructions executable by the one or more processors to obtain, via a user interface, a selection of a continuous features of a dataset for representation in a histogram. The dataset comprises a plurality of records having a plurality of features including one or more continuous features. Each of the plurality of records has corresponding values for each of the plurality of features, where values for the one or more continuous features are quantitative numerical values. The instructions are further executable to determine a number of bins for the histogram. The instructions are further executable to determine a bin width based on the number of bins and feature statistics of the continuous feature. The instructions are further executable to determine an approximated bin interval range by applying a bin mask based on the bin width to the feature statistics. The instructions are further executable to determine an approximated bin width based on the number of bins and the approximated bin interval range. The instructions are further executable to determine approximated bin intervals for the histogram based on the approximated bin width. The instructions are further executable to generate a histogram for the continuous feature. The histogram has the number of bins and the bins of the histogram have intervals based the approximated bin intervals. Each bin of the histogram represents a count of values of the continuous feature in the dataset within the corresponding approximated bin interval. The instructions are further executable to present the histogram for the continuous feature in the user interface.

In some embodiments of the computer system, the feature statistics of the continuous feature include a maximum value of the continuous feature in the dataset and a minimum value of the continuous feature in the dataset.

In some embodiments of the computer system, the computer program code further comprises sets of instructions executable by the one or more processors to round the maximum value up to determine a rounded maximum value, multiply the rounded maximum value by the bin mask to determine a treated maximum value, where the determination of the approximated bin interval range being based on the treated maximum value, round down the minimum value to determine a rounded minimum value, and multiply the rounded minimum value by the bin mask to determine a treated minimum value, where the determination of the approximated bin interval range being based on the treated minimum value.

In some embodiments of the computer system, the determination of the approximated bin interval range is based on an absolute value of a difference between the rounded maximum value and the rounded minimum value.

In some embodiments of the computer system, the computer program code further comprises sets of instructions executable by the one or more processors to determine whether the bin width is divisible by ten and apply the bin mask to the approximated bin width if the bin width is not divisible by ten.

In some embodiments of the computer system, the computer program code further comprises sets of instructions executable by the one or more processors to sort the approximated bin intervals for the histogram in ascending order or descending order based on configuration information and truncate a first sorted bin interval and a last sorted bin interval based on the configuration information.

In some embodiments of the computer system, the computer program code further comprises sets of instructions executable by the one or more processors to determine a set of features that impact values a target feature selected via the user interface, the set of features including the continuous features, generate histograms for each other feature in the set of features besides the continuous feature, and present the histograms for each other feature in the user interface.

Another embodiment provides one or more non-transitory computer-readable medium storing computer program code. The computer program code comprises sets of instructions to obtain, via a user interface, a selection of a continuous features of a dataset for representation in a histogram. The dataset comprises a plurality of records having a plurality of features including one or more continuous features where each of the plurality of records has corresponding values for each of the plurality of features. The values for the one or more continuous features are quantitative numerical values. The computer program code further comprises sets of instructions to determine a number of bins for the histogram. The computer program code further comprises sets of instructions to determine a bin width based on the number of bins and feature statistics of the continuous feature. The computer program code further comprises sets of instructions to determine an approximated bin interval range by applying a bin mask based on the bin width to the feature statistics. The computer program code further comprises sets of instructions to determine an approximated bin width based on the number of bins and the approximated bin interval range. The computer program code further comprises sets of instructions to determine approximated bin intervals for the histogram based on the approximated bin width. The computer program code further comprises sets of instructions to generate a histogram for the continuous feature. The histogram has the number of bins and the bins of the histogram have intervals based the approximated bin intervals. Each bin of the histogram represents a count of values of the continuous feature in the dataset within the corresponding approximated bin interval. The computer program code further comprises sets of instructions to present the histogram for the continuous feature in the user interface.

In some embodiments of the non-transitory computer-readable medium, the feature statistics of the continuous feature include a maximum value of the continuous feature in the dataset and a minimum value of the continuous feature in the dataset.

In some embodiments of the non-transitory computer-readable medium, the computer program code further comprises sets of instructions to round the maximum value up to determine a rounded maximum value, multiply the rounded maximum value by the bin mask to determine a treated maximum value, where the determination of the approximated bin interval range being based on the treated maximum value, round down the minimum value to determine a rounded minimum value, and multiply the rounded minimum value by the bin mask to determine a treated minimum value, where the determination of the approximated bin interval range being based on the treated minimum value.

In some embodiments of the non-transitory computer-readable medium, the determination of the approximated bin interval range is based on an absolute value of a difference between the rounded maximum value and the rounded minimum value.

In some embodiments of the non-transitory computer-readable medium, the computer program code further comprises sets of instructions to determine whether the bin width is divisible by ten, and apply the bin mask to the approximated bin width if the bin width is not divisible by ten.

In some embodiments of the non-transitory computer-readable medium, the computer program code further comprises sets of instructions to sort the approximated bin intervals for the histogram in ascending order or descending order based on configuration information, and truncate a first sorted bin interval and a last sorted bin interval based on the configuration information.

In some embodiments of the non-transitory computer-readable medium, the computer program code further comprises sets of instructions to determine a set of features that impact values a target feature selected via the user interface, the set of features including the continuous features, generate histograms for each other feature in the set of features besides the continuous feature, and present the histograms for each other feature in the user interface.

Another embodiment provides a computer-implemented method. The method includes obtaining, via a user interface, a selection of a continuous features of a dataset for representation in a histogram. The dataset comprises a plurality of records having a plurality of features including one or more continuous features where each of the plurality of records has corresponding values for each of the plurality of features. Values for the one or more continuous features are quantitative numerical values. The method further comprises determining a number of bins for the histogram. The method further comprises determining a bin width based on the number of bins and feature statistics of the continuous feature. The method further comprises determining an approximated bin interval range by applying a bin mask based on the bin width to the feature statistics. The method further comprises determining an approximated bin width based on the number of bins and the approximated bin interval range. The method further comprises determining approximated bin intervals for the histogram based on the approximated bin width. The method further comprises generating a histogram for the continuous feature. The histogram has the number of bins and the bins of the histogram have intervals based the approximated bin intervals. Each bin of the histogram represents a count of values of the continuous feature in the dataset within the corresponding approximated bin interval. The method further comprises presenting the histogram for the continuous feature in the user interface.

In some embodiments of the method, the feature statistics of the continuous feature include a maximum value of the continuous feature in the dataset and a minimum value of the continuous feature in the dataset.

In some embodiments of the method, the method further comprises rounding the maximum value up to determine a rounded maximum value, multiplying the rounded maximum value by the bin mask to determine a treated maximum value, where the determination of the approximated bin interval range being based on the treated maximum value, rounding down the minimum value to determine a rounded minimum value, and multiplying the rounded minimum value by the bin mask to determine a treated minimum value, where the determination of the approximated bin interval range being based on the treated minimum value.

In some embodiments of the method, the determination of the approximated bin interval range is based on an absolute value of a difference between the rounded maximum value and the rounded minimum value.

In some embodiments of the method, the method further comprising determining whether the bin width is divisible by ten, and applying the bin mask to the approximated bin width if the bin width is not divisible by ten.

In some embodiments of the method, the method further comprises sorting the approximated bin intervals for the histogram in ascending order or descending order based on configuration information, and truncating a first sorted bin interval and a last sorted bin interval based on the configuration information.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer system, comprising:
   one or more processors; and
   one or more machine-readable medium coupled to the one or more processors and storing computer program code comprising sets of instructions for executable by the one or more processors to:
   obtain, via a user interface, a selection of a continuous features of a dataset for representation in a histogram, the dataset comprising a plurality of records having a plurality of features including one or more continuous features, each of the plurality of records having corresponding values for each of the plurality of features, values for the one or more continuous features being quantitative numerical values;
   determine a number of bins for the histogram;
   determine a bin width based on the number of bins and feature statistics of the continuous feature;
   determine an approximated bin interval range by applying a bin mask based on the bin width to the feature statistics;
   determine an approximated bin width based on the number of bins and the approximated bin interval range;
   determine approximated bin intervals for the histogram based on the approximated bin width;
   generate a histogram for the continuous feature, the histogram having the number of bins, the bins of the histogram having intervals based the approximated bin intervals, each bin of the histogram representing a count of values of the continuous feature in the dataset within the corresponding approximated bin interval; and
   present the histogram for the continuous feature in the user interface.

2. The computer system of claim 1, wherein the feature statistics of the continuous feature include a maximum value of the continuous feature in the dataset and a minimum value of the continuous feature in the dataset.

3. The computer system of claim 2, wherein the computer program code further comprises sets of instructions executable by the one or more processors to:
   round the maximum value up to determine a rounded maximum value;
   multiply the rounded maximum value by the bin mask to determine a treated maximum value, the determination of the approximated bin interval range being based on the treated maximum value;
   round down the minimum value to determine a rounded minimum value; and
   multiply the rounded minimum value by the bin mask to determine a treated minimum value, the determination of the approximated bin interval range being based on the treated minimum value.

4. The computer system of claim 3, wherein the determination of the approximated bin interval range is based on an absolute value of a difference between the rounded maximum value and the rounded minimum value.

5. The computer system of claim 1, wherein the computer program code further comprises sets of instructions executable by the one or more processors to:
   determine whether the bin width is divisible by ten; and
   apply the bin mask to the approximated bin width if the bin width is not divisible by ten.

6. The computer system of claim 1, wherein the computer program code further comprises sets of instructions executable by the one or more processors to:
   sort the approximated bin intervals for the histogram in ascending order or descending order based on configuration information; and
   truncate a first sorted bin interval and a last sorted bin interval based on the configuration information.

7. The computer system of claim 1, wherein the computer program code further comprises sets of instructions executable by the one or more processors to:
   determine a set of features that impact values a target feature selected via the user interface, the set of features including the continuous features;
   generate histograms for each other feature in the set of features besides the continuous feature; and
   present the histograms for each other feature in the user interface.

8. One or more non-transitory computer-readable medium storing computer program code comprising sets of instructions to:
   obtain, via a user interface, a selection of a continuous features of a dataset for representation in a histogram, the dataset comprising a plurality of records having a plurality of features including one or more continuous features, each of the plurality of records having corresponding values for each of the plurality of features, values for the one or more continuous features being quantitative numerical values;
   determine a number of bins for the histogram;
   determine a bin width based on the number of bins and feature statistics of the continuous feature;
   determine an approximated bin interval range by applying a bin mask based on the bin width to the feature statistics;
   determine an approximated bin width based on the number of bins and the approximated bin interval range;
   determine approximated bin intervals for the histogram based on the approximated bin width;
   generate a histogram for the continuous feature, the histogram having the number of bins, the bins of the histogram having intervals based the approximated bin intervals, each bin of the histogram representing a count of values of the continuous feature in the dataset within the corresponding approximated bin interval; and
   present the histogram for the continuous feature in the user interface.

9. The non-transitory computer-readable medium of claim 8, wherein the feature statistics of the continuous feature include a maximum value of the continuous feature in the dataset and a minimum value of the continuous feature in the dataset.

10. The non-transitory computer-readable medium of claim 9, wherein the computer program code further comprises sets of instructions to:
    round the maximum value up to determine a rounded maximum value;
    multiply the rounded maximum value by the bin mask to determine a treated maximum value, the determination of the approximated bin interval range being based on the treated maximum value;
    round down the minimum value to determine a rounded minimum value; and
    multiply the rounded minimum value by the bin mask to determine a treated minimum value, the determination of the approximated bin interval range being based on the treated minimum value.

11. The non-transitory computer-readable medium of claim 10, wherein the determination of the approximated bin interval range is based on an absolute value of a difference between the rounded maximum value and the rounded minimum value.

12. The non-transitory computer-readable medium of claim 8, wherein the computer program code further comprises sets of instructions to:
determine whether the bin width is divisible by ten; and
apply the bin mask to the approximated bin width if the bin width is not divisible by ten.

13. The non-transitory computer-readable medium of claim 8, wherein the computer program code further comprises sets of instructions to:
sort the approximated bin intervals for the histogram in ascending order or descending order based on configuration information; and
truncate a first sorted bin interval and a last sorted bin interval based on the configuration information.

14. The non-transitory computer-readable medium of claim 8, wherein the computer program code further comprises sets of instructions to:
determine a set of features that impact values a target feature selected via the user interface, the set of features including the continuous features;
generate histograms for each other feature in the set of features besides the continuous feature; and
present the histograms for each other feature in the user interface.

15. A computer-implemented method, comprising:
obtaining, via a user interface, a selection of a continuous features of a dataset for representation in a histogram, the dataset comprising a plurality of records having a plurality of features including one or more continuous features, each of the plurality of records having corresponding values for each of the plurality of features, values for the one or more continuous features being quantitative numerical values;
determining a number of bins for the histogram;
determining a bin width based on the number of bins and feature statistics of the continuous feature;
determining an approximated bin interval range by applying a bin mask based on the bin width to the feature statistics;
determining an approximated bin width based on the number of bins and the approximated bin interval range, determining approximated bin intervals for the histogram based on the approximated bin width;
generating a histogram for the continuous feature, the histogram having the number of bins, the bins of the histogram having intervals based the approximated bin intervals, each bin of the histogram representing a count of values of the continuous feature in the dataset within the corresponding approximated bin interval; and
presenting the histogram for the continuous feature in the user interface.

16. The computer-implemented method of claim 15, wherein the feature statistics of the continuous feature include a maximum value of the continuous feature in the dataset and a minimum value of the continuous feature in the dataset.

17. The computer-implemented method of claim 16, further comprising:
rounding the maximum value up to determine a rounded maximum value;
multiplying the rounded maximum value by the bin mask to determine a treated maximum value, the determination of the approximated bin interval range being based on the treated maximum value;
rounding down the minimum value to determine a rounded minimum value; and
multiplying the rounded minimum value by the bin mask to determine a treated minimum value, the determination of the approximated bin interval range being based on the treated minimum value.

18. The computer-implemented method of claim 17, wherein the determination of the approximated bin interval range is based on an absolute value of a difference between the rounded maximum value and the rounded minimum value.

19. The computer-implemented method of claim 15, further comprising:
determining whether the bin width is divisible by ten; and
applying the bin mask to the approximated bin width if the bin width is not divisible by ten.

20. The computer-implemented method of claim 15, further comprising:
sorting the approximated bin intervals for the histogram in ascending order or descending order based on configuration information; and
truncating a first sorted bin interval and a last sorted bin interval based on the configuration information.

* * * * *